Nov. 6, 1923.
H. B. ROSS
DIFFERENTIAL STEERING GEAR
Filed Oct. 6, 1921
1,472,940
2 Sheets-Sheet 2
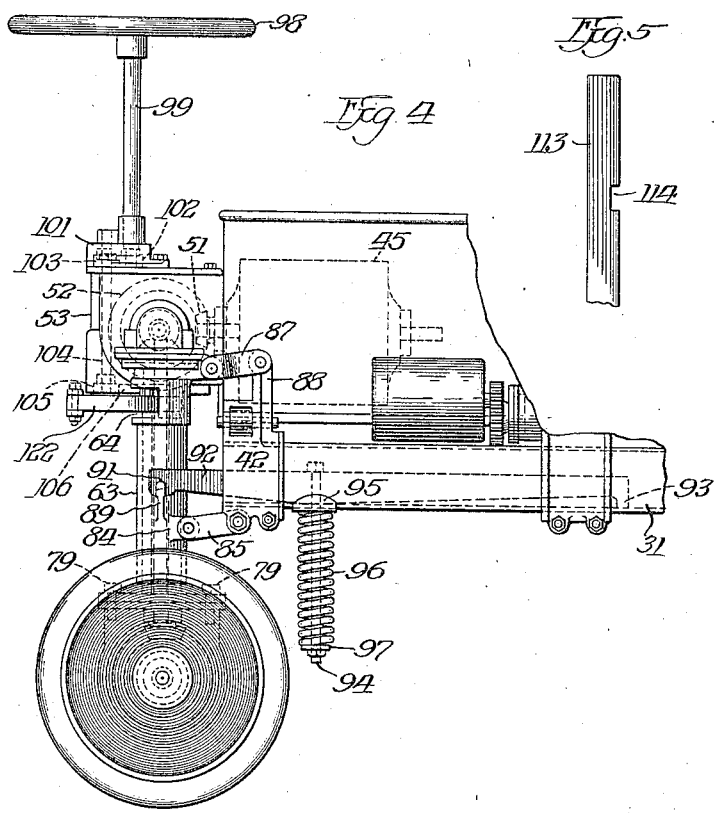

Patented Nov. 6, 1923.

1,472,940

UNITED STATES PATENT OFFICE.

HARRY B. ROSS, OF BENTON HARBOR, MICHIGAN, ASSIGNOR TO THE ROSS CARRIER COMPANY, OF BENTON HARBOR, MICHIGAN, A CORPORATION OF MICHIGAN.

DIFFERENTIAL STEERING GEAR.

Application filed October 6, 1921. Serial No. 505,747.

*To all whom it may concern:*

Be it known that I, HARRY B. ROSS, a citizen of the United States, residing at Benton Harbor, in the county of Berrien and State of Michigan, have invented certain new and useful Improvements in Differential Steering Gears, of which the following is a specification.

This invention pertains to improvements and novel features of advantage in steering-gears for power-driven vehicles and has for its main object or principal aim a construction that permits of turning the steering-wheels to a greater angle, thus allowing a shorter or sharper turn of the vehicle, than is possible with the ordinary method of connecting together the steering-wheels of automobiles.

A further object of the invention is the provision of a mechanism of this type, whereby, when making a turn the movement of the inside wheel is gradually accelerated and that of the outside wheel is gradually retarded in their angular movements, whereby the axes of both steering-wheels will at all times be in true radial alignment or register with the center of turning radius, thus avoiding any side slippage of the wheels.

This is ordinarily accomplished to a limited degree by a mechanism wherein the tie-rod connecting the steering-knuckles together is longer or shorter than the distance between the pivotal connections of such steering-knuckles with the axle, depending respectively upon whether the tie-rod is in front of or back of the axle. Such a structure does not attain perfect steering conditions and is only practical in turning the wheels to an angle not exceeding thirty degrees, whereas, with my improved and novel device, the wheels may be turned through an angle of seventy-five degrees or more and still maintain both wheels in the true relative angular positions required. This permits as short a turning radius with only two steering-wheels as is accomplished with a four-wheel steering mechanism in other devices, and it is particularly adapted to types of vehicles having power-driven steering-wheels.

To enable those skilled in this art to fully understand the invention both from structural and operative standpoints, I have illustrated two embodiments of the same in the accompanying drawings forming a part of this specification and to which reference should be had in connection with the following detailed description, like reference characters referring to the same parts throughout the several views.

In these drawings:

Figure 4 is a fragmentary side elevation of a vehicle equipped with such steering mechanism;

Figures 5 and 6 illustrate respectively one of the sliding bars and its pivoted dog forming parts of the steering device;

Figure 7 is an enlarged vertical section through the gear accommodating the pair of sliding bars operatively connected to the two steering knuckles; and Figure 8 is a view similar to that of Figure 2 showing a modified structure employing only one sliding bar.

Figure 1:
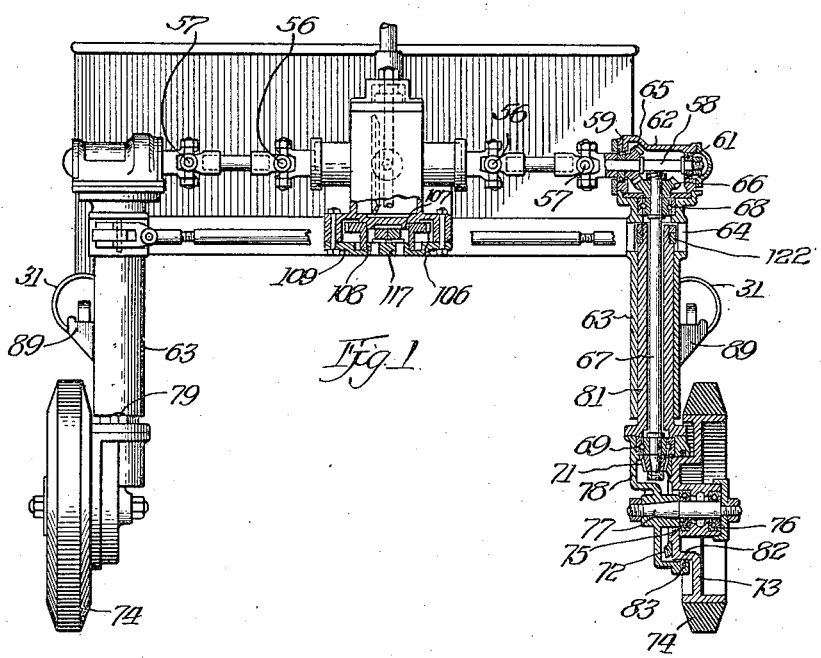
Figure 1 is a fragmentary partial front elevation and partial vertical transverse section through one form of the steering appliance.

Referring to the drawings, it will be seen that the shaft of the electric drive motor 45, supplied with electric energy from a storage-battery, not shown, is equipped with a bevel pinion 51 turning a bevel gear 52 in a differential gear casing or housing 53, the gearing in the latter being of any suitable or customary style to operate differentially as occasion requires the usual two shafts which are each connected to a short outer shaft 58 through a pair of associated universal-joints 56 and 57.

Each such shaft 58 is revolubly mounted in a pair of aligned ball-bearings 59 and 61 in a cap or top casing 62 fastened by screws or otherwise to the top of a hollow, upright column 63 cut away at its front through a considerable angle providing an arcuate opening 64.

By means of intermeshing bevel gears 65 of shaft 58 and 66 on the upper end of a vertical shaft 67 in the column, the latter shaft is rotated by the electric-motor through the mechanism described, the upright shaft in the column being rotatable in an upper ball-bearing 68 in the column and a similar lower anti-friction bearing 69 in a gear housing 78 below the column, the bearings, shafts, and gears being so arranged that the bearings act to sustain the vertical load thrust and as radial bearings for the shaft.

At its lower end, each shaft 67 has a bevel-pinion 71 coacting with a bevel-gear 72 on the inner face of a metal carrying or supporting driving and steering wheel 73 provided with a rubber tire 74, the hub of the wheel being revoluble on ball-bearings 75 and 76 on a stud-shaft or short-axle 77 mounted in the gear-housing 78 fixedly fastened by screws 79 to the lower end of a sleeve or hollow shaft 81 rotatable in the column 63, the central cylindrical portion 82 of the wheel cooperating with a packing 83 in the gear-housing for the exclusion of dust and other foreign matter from the interior of such housing.

Each such column 63 is connected by lower and upper links 85 and 87, preferably of the same length, to a suitably-shaped casting 42 fixedly mounted on the front end of a longitudinally-disposed tubular element 31 forming part of the main-frame of the truck, link 85 being hinged or pivoted to a lug 84 on the column, link 87 being similarly connected to another lug on the column and to an upwardly projecting part 88 of casting 42.

The frame and its live and dead loads is supported on each of such columns by means of an outstanding bracket 89 thereon over which hooks the front notched end 91 of a lever 92 accommodated in large measure in the tubular lengthwise frame element 31, its inner downturned end constituting a fulcrum 93 resting or bearing on the inner surface of the bottom wall of such part 31.

This portion of the frame is supported on an underlying upright coil-spring 96 bearing at its top end on a saddle 95 on the bottom of element 31, the lower end of the spring resting on a seat 97 on a bolt 94 extending up through apertures in the tubular member and the lever with its head bearing on the top face of the latter.

The truck is steered or guided by means of a steering-wheel 98 on the top end of a vertical shaft 99 journalled in a casing or housing 101, fastened to the top of the differential-gear casing 53 and enclosing coacting gears 102 and 103, by means of which shaft 99 actuates a shaft 104 inside the housing, the latter shaft having a pinion 105 at its lower end in mesh with a trunnion gear 106 revoluble on an upper depending trunnion 107 (Figure 7) on the bottom of the differential-gear housing and an aligned trunnion 108 on the top face of a plate 109 bolted to the bottom of such housing by bolts 110, 110.

Gear 106 has a transverse diametrical groove 111 with parallel walls at its opposite ends accommodating a pair of flat parallel bars 112 and 113 lying side by side in edge contact and unitedly of a combined width equalling that of the end portions of the groove, each bar on its under face having a rectangular cavity or recess 114 (Figure 5) receiving a correspondingly shaped dog 115 each having a cylindrical or shaft extension 116 occupying a bearing 117 in plate 109, the axes of the two spaced or eccentrically arranged bearings 117, 117 being on a vertical plane passing through the axis of the gear.

Each of such bars 112 and 113 as the case may be, is connected, through a pair of universal-joints 118 and 119 (Figures 2 and 3) and an intervening rod 121 adjustable as to length, with the corresponding steering arm 122 fastened to the steering shank or sleeve 81 on which the supporting rubber-tired wheel 73 is mounted.

Figure 2:
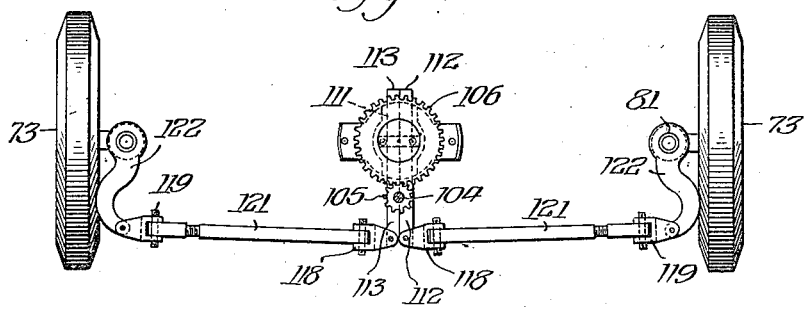
Figure 2 is a horizontal section or plan view with parts removed with the steering wheels in straight ahead position.

When the groove of the trunnion gear and a pair of bars therein are in neutral position, as illustrated in Figure 2, the two steering-wheels 73 with which such bars are operatively connected are directed straight ahead, the two bars project from such gear equal amounts, and the two inner universal-joints 118 are practically unseparated.

Figure 3:
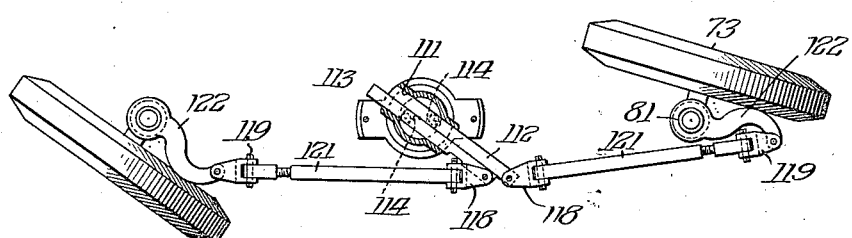
Figure 3 is a similar view with the wheels turned to one side.

When, however, the steering-wheel 98 is swung to turn the wheels 73 to one side, as shown in Figure 3, the one bar 113, corresponding to the outer wheel is moved or slid inwardly somewhat through the gear by reason of the stationary bearing of its dog 115 and the turning of the gear, and in similar manner the companion bar 112 is projected somewhat forwardly.

Thus a differential or unequal action of the pair of bars and the two supporting wheels is effected, the outer one turning less than the inner one, or conversely, the inner one turning to a greater degree than the outer one, whereby the axes of the two wheels are always maintained true to the center or point around which they are traveling.

It will be observed that under these circumstances the distance between the pivotal connections with the steering arms 122, 122 is automatically increased the proper amount to secure the correct relation of the ground wheels to prevent side slippage, and it will also be perceived that this distance is increased in proportion to the extent of turning of the steering wheel in the hands of the operator.

It will be seen, furthermore, that this increase in distance is effected practically solely by bringing about the separation of the universal-joints 118, 118 by sliding the two bars 112, 113 relatively to one another, the extent of their movement being predetermined by the degree of separation of the two dog bearings 117, 117.

When the operator turns the steering-wheel in the opposite direction, the bars will be shifted reversely, that is to say the formerly projected one will be withdrawn and the formerly retracted one will be extended forwardly as is required to maintain the proper relation of the load-supporting steering-wheels at all times.

It is not necessary to employ two of such relatively slidable bars, because the single movement of one bar may be used to reach the desired result.

Accordingly in Figure 8, a modification of the structure is depicted employing only a single bar 201 the full width of the gear groove, such bar of course having its single coacting eccentric pivoted or journalled dog 202 having a turning center 203.

The back end of such bar is connected by a link 204 to the rearwardly projecting steering-arm 205 of one load-carrying steering wheel and the opposite or front end is similarly connected by a link 206 to the forwardly-extended steering-arm 207 of the other or opposite ground wheel.

When the steering handle or wheel is turned, the bar is slid automatically relatively to or in the gear, either forwardly or rearwardly as the case may be, by reason of the angular movement of the latter and the stationary eccentric pivoted mounting of the dog as in the previous instance, which movement brings about the unequal or differential turning of the two wheels.

In both cases, the length of the arm, that is the effective length of the bar, connected to the outer wheel, is shortened by the sliding of the bar in the gear, and the length of the arm connected to the inner wheel is lengthened, whereby, during the equal turning movements of the two arms or bars by reason of the partial rotation of the gear, the two wheels are turned different amounts, as is needed to always maintain them true to the center about which they are to travel.

Such a structure, by reason of the positive, carefully-calculated, differential turning movements of the correlated ground steering-wheels permits the vehicle to make very sharp turns by means of steering only two wheels, in fact as abrupt turns may be made with this appliance as with those trucks steered by movement of all four wheels.

This truck is capable of entering an ordinary freight car through its side door, picking up a load, and carrying it out through such doorway, this capacity of course being dependent upon the sharp angular curve which may be made by the front steering wheels.

It is to be observed, in addition, that this steering mechanism in no way interferes with the means for driving such front wheels, the operation of which will be readily understood from the above description of its construction.

While two embodiments only of this invention have been illustrated and described, those skilled in this art will readily understand that the invention is susceptible of a variety of embodiments and that many minor mechanical changes may be made in the construction without departure from the heart and essence of the invention and without the sacrifice of any of its substantial benefits and advantages.

I claim:

1. In a steering-mechanism of the character described, the combination of a pair of pivotally-mounted steering-knuckles, a vehicle-wheel revoluble on each of said knuckles, a pair of bars, means connecting each of said bars to the corresponding steering-knuckle, means to turn said bars simultaneously about a common center, and means to shift said bars simultaneously lengthwise with reference to one another.

2. In a steering-mechanism of the character described, the combination of a pair of pivotally-mounted steering-knuckles, a vehicle-wheel revoluble on each of said knuckles, a pair of parallel bars, means connecting each of said bars to the corresponding steering-knuckle, means to turn said bars simultaneously in their own plane about a common center, and means to shift said bars simultaneously lengthwise with reference to one another.

3. In a steering-mechanism of the character described, the combination of a slotted oscillatory member, means to oscillate said member, a bar slidable lengthwise in said slot, means to effect lengthwise movement of said bar simultaneously with its turning movement with said member, a pivotally-mounted steering-knuckle, a vehicle-wheel revoluble on said knuckle, and a link connecting said bar and knuckle.

4. In a steering-mechanism of the character described in combination a slotted oscillatory member, means to oscillate said member, a bar slidable lengthwise in said slot, means to effect lengthwise movement of said bar simultaneously with and in the plane of its turning movement with said member, a pivotally-mounted steering-knuckle, a vehicle-wheel revoluble on said knuckle, and a link connecting said bar and knuckle.

5. In a steering-mechanism of the character described, the combination of an oscillatory slotted gear, means to oscillate said gear to effect the steering operations, a pair of parallel notched bars slidable in the slot of and oscillatory with said gear, a dog in the notch of each bar having a stationary pivotal mounting eccentric to the axis of said gear, a pair of pivotally-mounted steering-knuckles, a vehicle-wheel revoluble on each of said knuckles, and means connecting each of said bars to the corresponding steering-knuckle, whereby during the turning movement of said bars they are simultaneously shifted lengthwise relative to one another in the same plane.

6. In a steering-mechanism of the character described, the combination of an oscillatory slotted gear, means to oscillate said gear to effect the steering operations, a pair of parallel notched bars arranged side by side slidable in the slot of and oscillatory with said gear, a dog in the notch of each bar having a stationary pivotal mounting eccentric to the axis of said gear, a pair of pivotally-mounted steering-knuckles, a vehicle-wheel revoluble on each of said knuckles, and means connecting each of said bars to the corresponding steering-knuckle, whereby during the turning movement of said bars in their own plane by the gear they are simultaneously shifted lengthwise relative to one another.

HARRY B. ROSS.